(12) United States Patent
Holzer

(10) Patent No.: US 8,458,335 B2
(45) Date of Patent: Jun. 4, 2013

(54) METHOD AND APPARATUS FOR RELATIONSHIP MANAGEMENT

(75) Inventor: David Holzer, San Jose, CA (US)

(73) Assignee: Digi International Inc., Minnetonka, MN (US)

( * ) Notice: Subject to any disclaimer, the term of this patent is extended or adjusted under 35 U.S.C. 154(b) by 1807 days.

(21) Appl. No.: 09/884,741

(22) Filed: Jun. 18, 2001

(65) Prior Publication Data

US 2007/0027961 A1   Feb. 1, 2007

(51) Int. Cl.
*G06F 15/16* (2006.01)

(52) U.S. Cl.
USPC ........................................... 709/227

(58) Field of Classification Search
USPC .. 709/216–232; 348/211.8–211.14; 726/1–21
See application file for complete search history.

(56) References Cited

U.S. PATENT DOCUMENTS

| | | | | |
|---|---|---|---|---|
| 5,751,719 | A * | 5/1998 | Chen et al. | 370/473 |
| 6,058,399 | A * | 5/2000 | Morag et al. | 707/201 |
| 6,353,848 | B1 * | 3/2002 | Morris | 709/203 |
| 6,442,573 | B1 * | 8/2002 | Schiller et al. | 715/500.1 |
| 6,463,474 | B1 * | 10/2002 | Fuh et al. | 709/225 |
| 6,542,967 | B1 | 4/2003 | Major | |
| 6,567,122 | B1 * | 5/2003 | Anderson et al. | 348/211.3 |
| 6,636,259 | B1 * | 10/2003 | Anderson et al. | 348/211.3 |
| 6,662,218 | B2 * | 12/2003 | Mighdoll et al. | 709/219 |
| 6,697,806 | B1 * | 2/2004 | Cook | 707/10 |
| 6,714,979 | B1 * | 3/2004 | Brandt et al. | 709/225 |
| 6,784,924 | B2 * | 8/2004 | Ward et al. | 348/207.1 |
| 6,934,372 | B1 * | 8/2005 | Lynam et al. | 379/111 |

OTHER PUBLICATIONS

PCT Search Report, mailed Aug. 2, 2002, 2 pp.
Underwood, Ryan, *To Connect and Serve, Silicon Valley upstart Embrace Networks has unveiled a system that Internet-enables any device, eliminating the need for costly 'one-off' solutions*. Internet On-line Apr. 24, 2001, XP002206279 (1 p.) <http://www.embracenetworks.com/news/news_2001-04-24.html>.
Dunkel, Brian et al., *Customized Metadata for Internet Information*, ISBN 0-7803-3755-7/97 1997 IEEE—pp. 508-516, (5 pp.).

\* cited by examiner

*Primary Examiner* — Jerry Dennison
(74) *Attorney, Agent, or Firm* — Heimlich Law, PC; Alan Heimlich, Esq.

(57) ABSTRACT

A method and apparatus for relationship management of devices utilizing a network are described. A service aggregator receives information from a device and sends information to the device directing the device to communicate with a service provider.

4 Claims, 9 Drawing Sheets

METHOD AND APPARATUS FOR RELATIONSHIP MANAGEMENT

FIELD OF THE INVENTION

The present invention pertains to the managing of relationships. More particularly, the present invention relates to a method and apparatus for relationship management of devices utilizing a network.

BACKGROUND OF THE INVENTION

As networks have evolved, so to have the number of devices attached to networks. With the rapid expansion and proliferation of the Internet, for example, many companies are connecting a variety of devices to the Internet. Many of the early devices were sophisticated and had large computing capacity. As the Internet has evolved, there has been a trend to connect devices with limited computing power to the Internet. At the same time, the number of devices desired to be connected to the Internet has expanded greatly. Many of these devices with limited computing power, in order to achieve optimum functionality, may need to be connected to a variety of service providers. Thus, relationship management of such devices presents a challenge.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
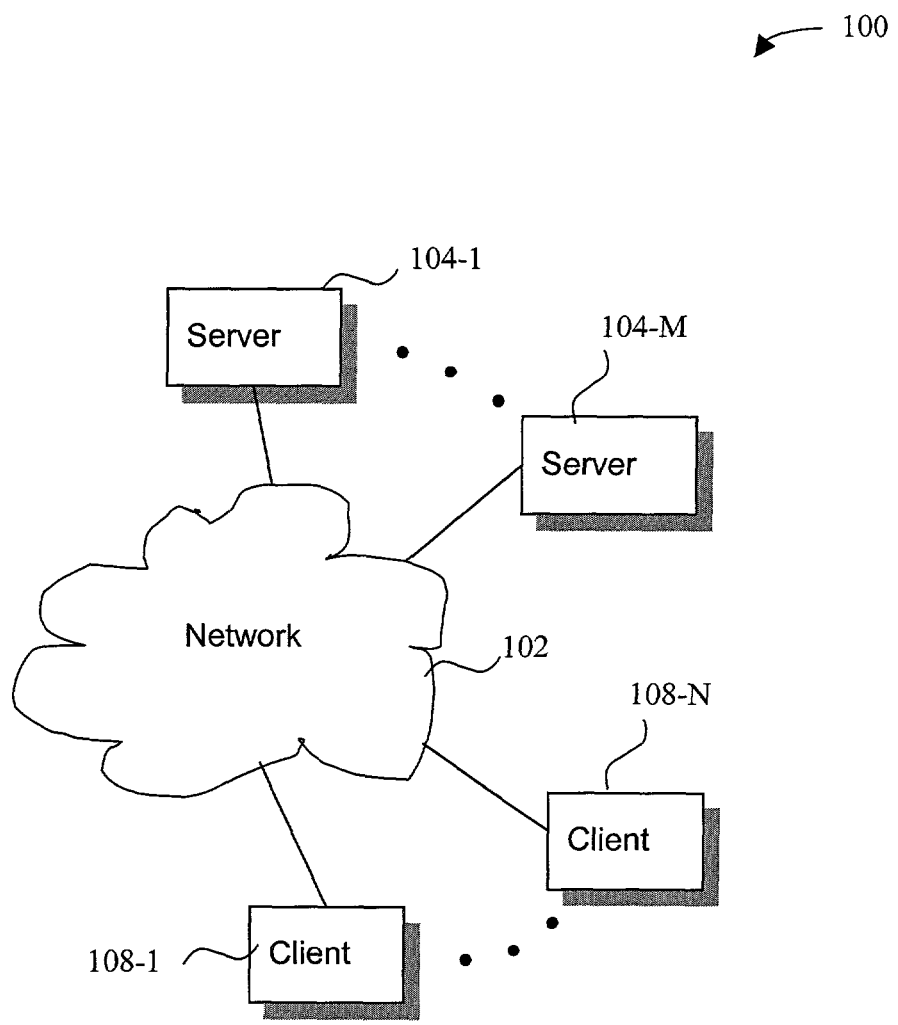
FIG. 1 illustrates a networked computer environment.

A method and apparatus for relationship management of devices utilizing a network are described.

For purposes of discussing the invention, it is to be understood that various terms are used by those knowledgeable in the art to describe techniques and approaches.

In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical, and other changes may be made without departing from the scope of the present invention.

Some portions of the detailed descriptions that follow may be presented in terms of algorithms and symbolic representations of operations on data bits possibly within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of skill in the art will immediately appreciate that the invention can be practiced with computer system configurations other than those described below, including hand-held devices, multiprocessor systems, microprocessor-based or programmable consumer electronics, digital signal processing (DSP) devices, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one skilled in the art would recognize a block denoting A+B=C as an additive function whose implementation in hardware and/or software would take two inputs (A and B) and produce a summation output (C). Similarly, one skilled in the art would recognize bit notation, such as [D7, . . . , D0] as representing 8 bit locations in a byte with D0 being the least significant bit and D7 being the most significant bit. Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

FIG. 1 illustrates a network environment 100 in which the techniques described may be applied. As shown, several computer systems in the form of M servers 104-1 through 104-M and N clients 108-1 through 108-N are connected to each other via a network, which may be, for example, the Internet. Note that alternatively the network 102 might be or include one or more of: a Local Area Network (LAN), Wide Area Network (WAN), satellite link, fiber network, cable network, wireless network, or a combination of these and/or others. The method and apparatus described herein may be applied to essentially any type of communicating means or device whether local or remote, such as a LAN, a WAN, a system bus, a disk drive, storage, etc.

Figure 2:
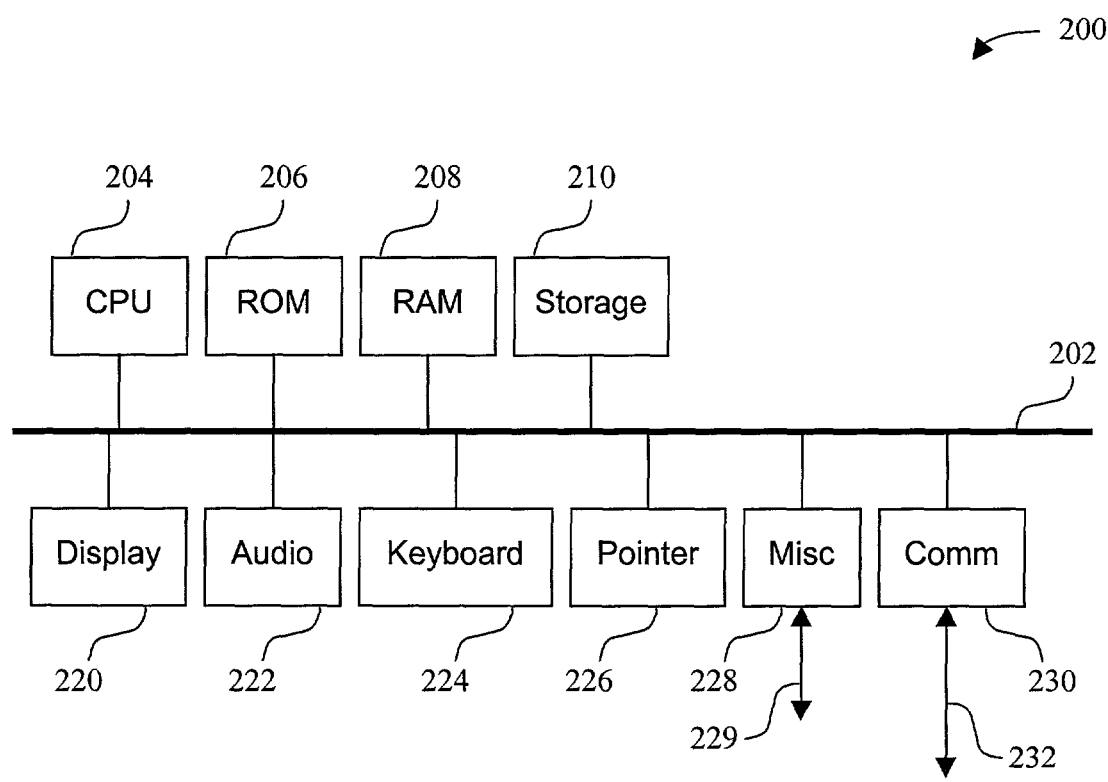
FIG. 2 is a block diagram of a computer system.

FIG. 2 illustrates a conventional personal computer 200 in block diagram form, which may be representative of any of the clients and servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), universal serial bus (USB), etc. The CPU 204 may be a single, multiple, or even a distributed computing resource. The ROM 206 may be any type of non-volatile memory, which may be programmable such as, mask programmable, flash, etc. RAM 208 may be, for example, static, dynamic, synchronous, asynchronous, or any combination. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Audio 222 may be a monophonic, stereo, three dimensional sound card, etc. The keyboard 224 may be a keyboard, a musical keyboard, a keypad, a series of switches, etc. The pointer 226, may be, for example, a mouse, a touchpad, a trackball, joystick, etc. I/O devices 228, might be a voice command input device, a thumbprint input device, a smart card slot, a Personal Computer Card (PC Card) interface, virtual reality accessories, etc., which may optionally connect via an input/output port 229 to other devices or systems. An example of a miscellaneous I/O device 228 would be a Musical Instrument Digital Interface (MIDI) card with the I/O port 229 connecting to the musical instrument(s). Communications device 230 might be, for example, an Ethernet adapter for local area network (LAN) connections, a satellite connection, a settop box adapter, a Digital Subscriber Line (xDSL) adapter, a wireless modem, a conventional telephone modem, a direct telephone connection, a Hybrid-Fiber Coax (HFC) connection, cable modem, etc. The external connection port 232 may provide for any interconnection, as needed, between a remote device and the bus system 202 through the communications device 230. For example, the communications device 230 might be an Ethernet adapter, which is connected via the connection port 232 to, for example, an external DSL modem. Note that depending upon the actual implementation of a computer system, the computer system may include some, all, more, or a rearrangement of components in the block diagram. For example, a thin client or consumer device might consist of a wireless hand held device that lacks, for example, a traditional keyboard. Another example might be an Internet radio consumer device which may not have the miscellaneous input/output (I/O) devices 228, storage 210, keyboard 224, or a pointer 226. Thus, many variations on the system of FIG. 2 are possible.

Referring back to FIG. 1, clients 108-1 through 108-N are effectively connected to web sites, application service providers, aggregators, search engines, and/or database resources represented by servers, such as servers 104-1 through 104-M, via the network 102. The web browser and/or other applications are generally running on the clients 108-1 through 108-N, while information generally resides on the servers 104-1 through 104-M. For ease of explanation, a single client 108-1 will be considered to illustrate one embodiment of the present techniques. It will be readily apparent that such techniques can be easily applied to multiple clients.

A subsystem may be, but is not limited to, one or more of the elements of FIG. 2. For example, Storage 210 may have a subsystem that handles how data is to be stored and retrieved. Audio 222 may have a subsystem that handles when to, for example, power down speakers. Communications device 230 may have, for example, a subsystem that needs to transfer information to the Storage 210.

A particular subsystem, such as, Storage 210 may be a storage system comprised of, for example, one or more hard disks. The interconnection of the disks in such a system may be by a variety of techniques including, for example, a daisy chain. Likewise, a variety of peripheral devices may be connected to the miscellaneous input/output (I/O) device 228, through the I/O port 229. For example, a USB connection would allow several devices to be daisy chained together and interface through I/O device 228 to bus 202.

Figure 3:
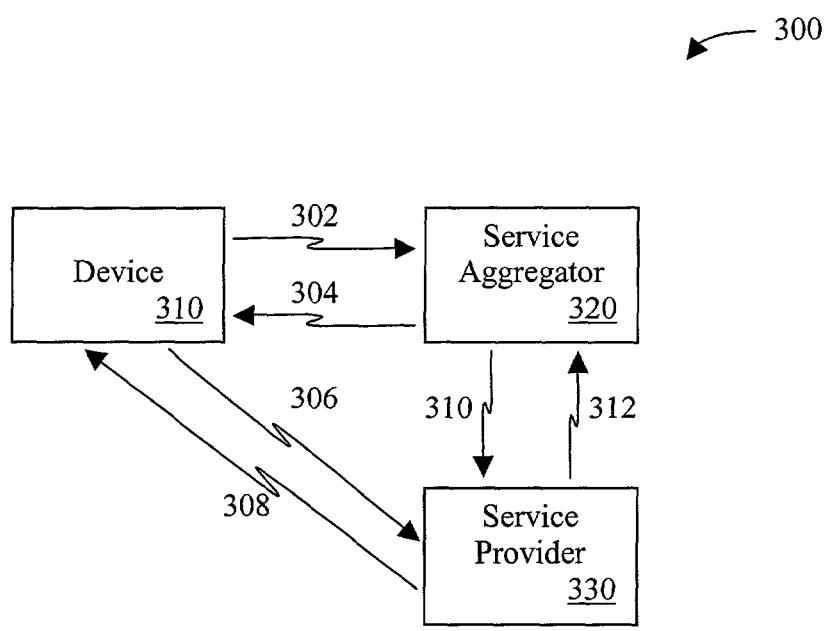
FIG. 3 illustrates one communication embodiment of a service aggregator, a service provider, and a device.

FIG. 3 illustrates one communication embodiment 300 having a service aggregator 320, a service provider 330, and a device 310. In this embodiment, device 310 and the service aggregator 320 communicate via communication links 302 and 304. Communication between the device 310 and the service provider 330 is via links 306 and 308, and communication between the service aggregator 320 and the service provider 330 is via links 310 and 312. For example, in this embodiment, device 310 may be a handheld digital camera. The communication links 302, 304, 306, and 308 may be a USB to Ethernet to DSL modem to Internet type connection. Service aggregator 320 may be located remotely and communicating via the Internet, and service provider 330 may be a web site portal for upload of pictures from the device 310. Additionally, service aggregator 320 may be communicating with service provider 330 via links 310 and 312, for example, via the Internet.

In another embodiment, device 310, for example a digital camera, may have available a display and user input (such as keyboard 224 and display 220 as shown in FIG. 2). The service aggregator 320 may send to the device a series of choices or options and the user may select one. One choice may be to upload pictures as mentioned above, while another may allow the device 310 to communicate with a specific service provider 330, for example, a service provider that may print photos received from device 310. Other options may include selecting a service provider that may upload pictures to a group picture viewing web site or photo album, print other pictures and send them to grandparents, etc.

In another embodiment of the present invention, the service provider 330 may communicate (via links 308 and 306) other information to device 310, such as, update information for the device, an aggregation of choices for the device, and an aggregation of choices for the device displayed on the device such that a user may select a specific choice.

The options or choices may originate from a variety of sources. For example, the service aggregator 320, based on information received from the device 310, may be able to present a series of options to the user of the device 310 based on knowledge gained earlier about the services that the service provider 330 supplies. Thus, for example, there may be a variety of service providers 330 that are capable of receiving pictures from a device 310, make prints and then mailing them back to the user of the device 310. Thus, when a device 310 communicates to the service aggregator that it is a digital camera, the service aggregator may present to the user through the device 310 a series of choices for services that the camera may require.

Additionally, if the user of a device 310 already has accounts set up at a series of service providers 330, then the service aggregator 320 may let the user of the device 310 select an existing account. Alternatively, the user may be able to input, through the device 310 new account information for a service provider 330 desired.

The ability of the service aggregator 320 to select and present to the user of the device 310 the various options may be based on the information received from the device 310. Such information may include device attribute information, branding information, account information, device serial number information, type of device information, application information, last time used information, etc. For example, a device attribute might place the device 310 into a general category of device, such as musical player, camera, thermostat, alarm system, air conditioner, etc. Branding information may be, for example, the manufacturer of the device. Account information may be service providers the user has registered with, Internet service providers (ISPs), music shops where a credit exists, etc. The device serial number may be used to look up in a database such information as the make, model, whether updates are needed, if the device was registered as stolen, etc. The type of device may be more specific than the attribute, for example, a movie camera, a still camera, a set-back thermostat, etc. Application information may be the types of applications currently running on the device or those it is capable of accessing. Last time used information may be for restarting an interrupted connection, showing the user the last choices made, etc.

Some of this information may be prespecified in the device itself or may be entered by the user. For example, branding information, serial number, and device type and attributes are most likely to be hard coded in the device. On the other hand, account information, etc. may be entered by the user.

Figure 8:
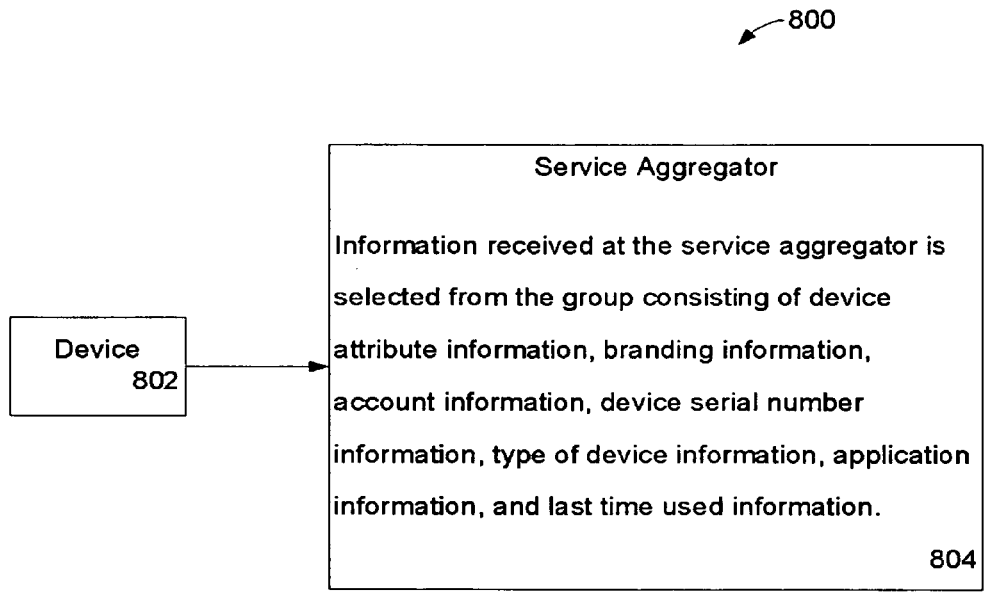
FIG. 8 illustrates one embodiment of the invention showing information received at the service aggregator.

FIG. 8 illustrates one embodiment of the invention 800 showing information received at the service aggregator. A device 802 is sending information to the service aggregator 804. At the service aggregator 804 the information received at the service aggregator is selected from the group consisting of device attribute information, branding information, account information, device serial number information, type of device information, application information, and last time used information.

Figure 4:
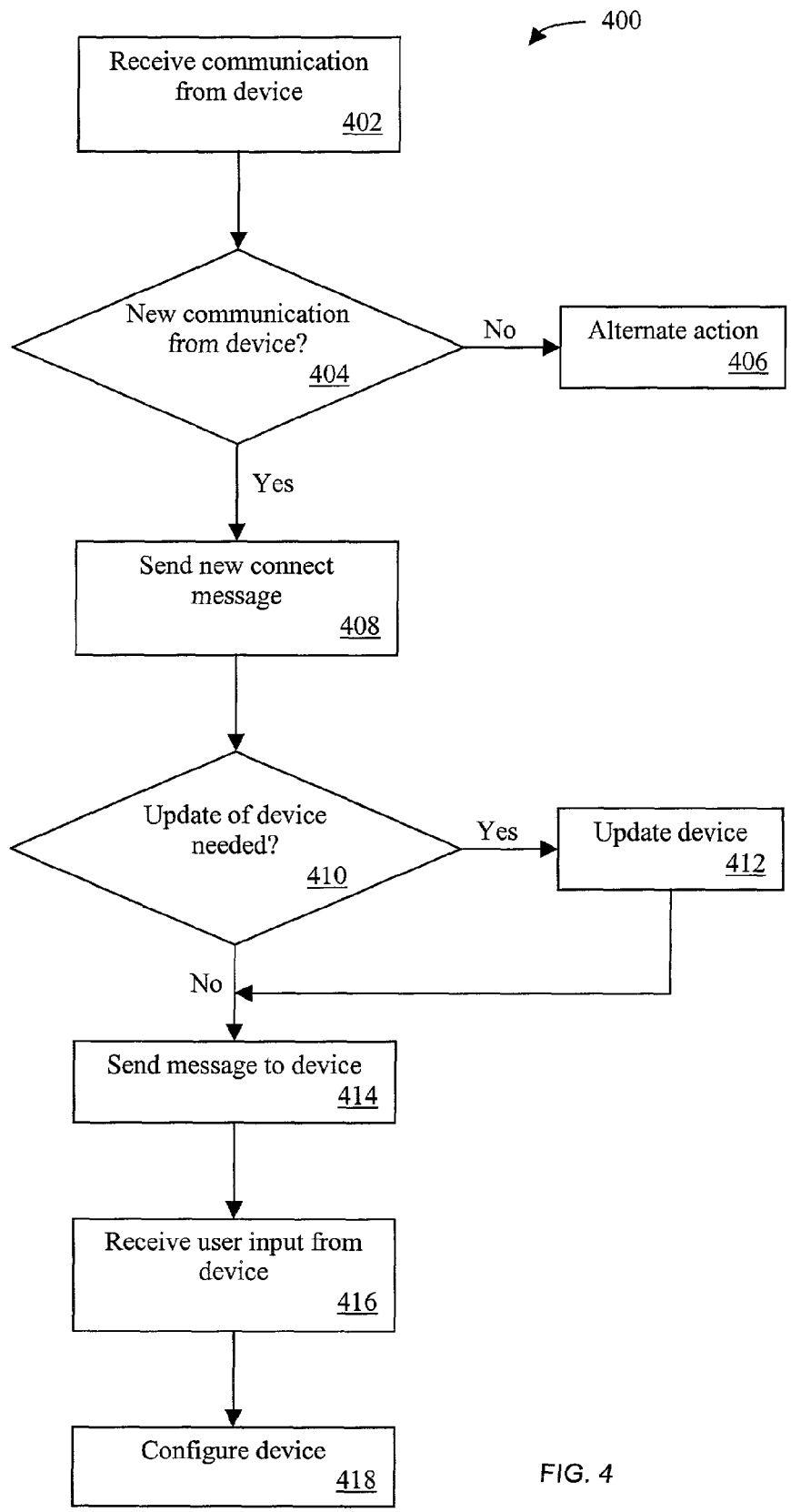
FIG. 4 illustrates in flow chart form one embodiment of part of relationship management.

FIG. 4 illustrates in flow chart form one embodiment of part of relationship management 400. At 402, a communication is received from a device 402. Next at 404 the communication is checked to see if it is a new communication from the device. If it is not a new communication, then an alternative action 406 may be taken. For example, if this not the first time a device has communicated with the relationship manager, then the alternative action 406 may require the relationship manager to check and see if the device previously failed to update properly, whether the previous communication was interrupted, if funds for purchasing products are available, etc. If it is a new communication from the device then the relationship manager sends a new connect message 408 to the device. Next, the relationship manager determines if an update of the device is needed 410. If an update is needed then the device is updated 412. After updating 412 or if the device does not need updating then a message is sent to the device 414. Any user input from the device is received 416 and the device is configured 418.

For example, a music playing device just purchased by a consumer may make an initial new communication to the relationship manager. The relationship manager may then send a message to the device, determine that it needs a new firmware update, perform the update, send a message to the device, receive user input and then configure the device to, for example, connect with an approved service provider of music to play on the device.

Figure 5:
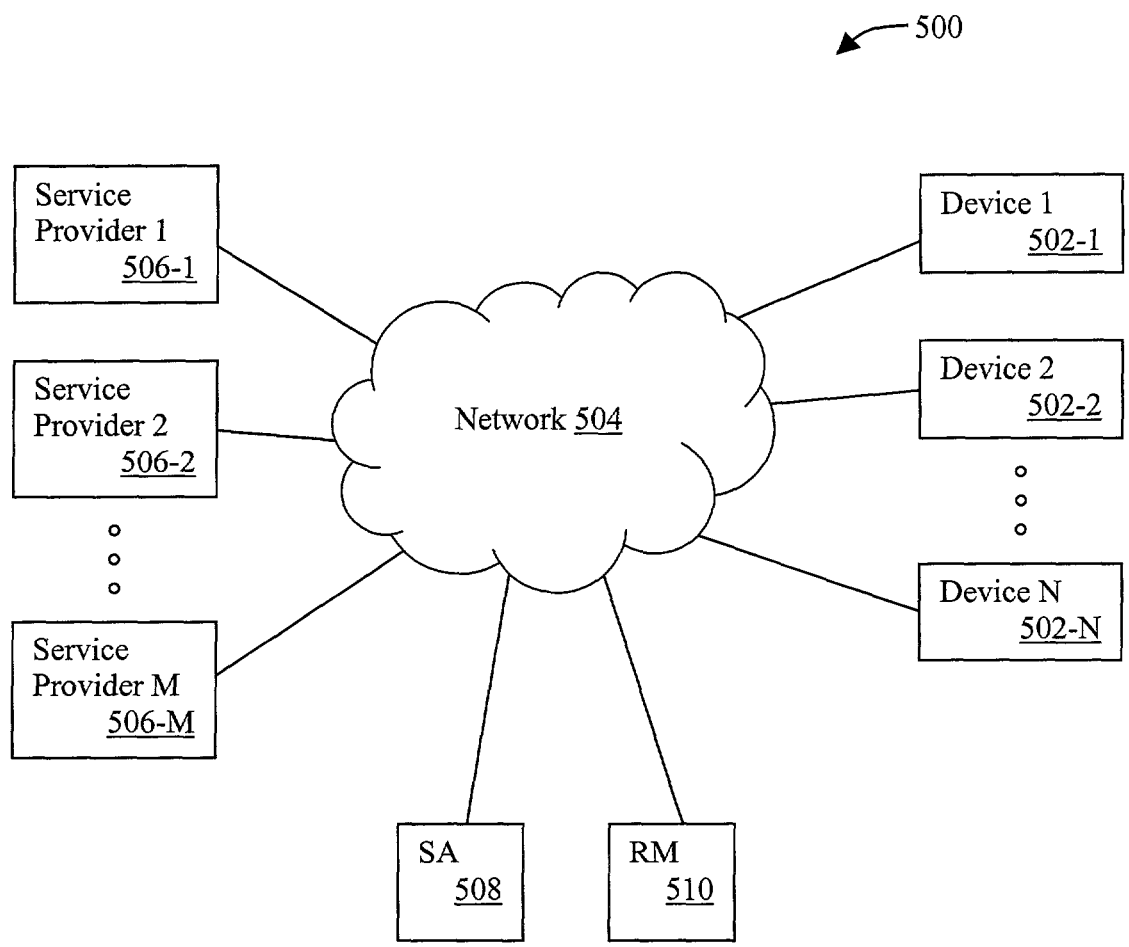
FIG. 5 illustrates one embodiment of an environment for relationship management.

FIG. 5 illustrates one embodiment of an environment 500 for relationship management. Here, a network 504 allows for communication between devices (502-1 to 502-N), service providers (506-1 to 506-M), a service aggregator (SA) 508, and a relation manager (RM) 510. While devices, service providers, the SA, and the RM are shown by separate blocks, it is to be understood that other embodiments may have other configurations. For example, the SA and RM may coexist as a single entity communicating with the network 504. Likewise, a variety of services may be provided by a single service provider. For example, a single service provider may provide music to a device and allow the user of that device to order a CD of the music, sheet music, etc.

One example of operation of environment 500 may be the following. As devices (502-1-502-N) are connected to the network 504, they may automatically communicate to the SA 508 information about themselves. The SA 508 may determine if a device needs to be updated and perform such an update. Additionally, the SA 508 may communicate to the RM 510 information about a device (502-1-502-N). In turn, the RM 510 based on this information, may communicate to the SA 508 choices to send to the device (502-1-502-N). The SA 508 may receive back the user choice from a device (502-1-502-N) and convey this to the RM 510 for storage. The RM 510 upon receiving and registering such a choice may send the SA 508 information to communicate to the device (502-1-502-N). This information may instruct the device to communicate directly with the appropriate service provider (506-1-506-M) to provide services based upon the user's choice.

Other modes of operation are also possible. For example, a service provider (506-1-506-M) may inform the RM 510 about such things as a user's account and how much credit they have. Thus, the RM 510 may inform the device when, for example, funds for purchasing a product are insufficient, etc.

While the SA 508 and RM 510 have been shown in FIG. 5 as single entities, it is to be appreciated that multiple SA's and RM's and/or their combinations are possible. Thus for example, a group of SA's and RM's may handle, for example, consumer digital cameras, while another group of SA's and RM's may handle, for example, MP3 players.

This relation management system can not only establish communication with the proper service providers, but also handle such tasks as accounting, privilege access, etc.

What is to be appreciated in FIG. 5 is that the SA 508 and RM 510 form a relation management system where devices (502-1-502-N) are associated with the appropriate service providers (506-1-506-M) to provide the devices with capabilities.

The details of actually storing the information associated with devices, aggregators, and service providers has not been detailed here as it is not necessary to the understanding of the present invention and one skilled in the art understands that there are many approaches that are capable of storing such information.

Figure 6:
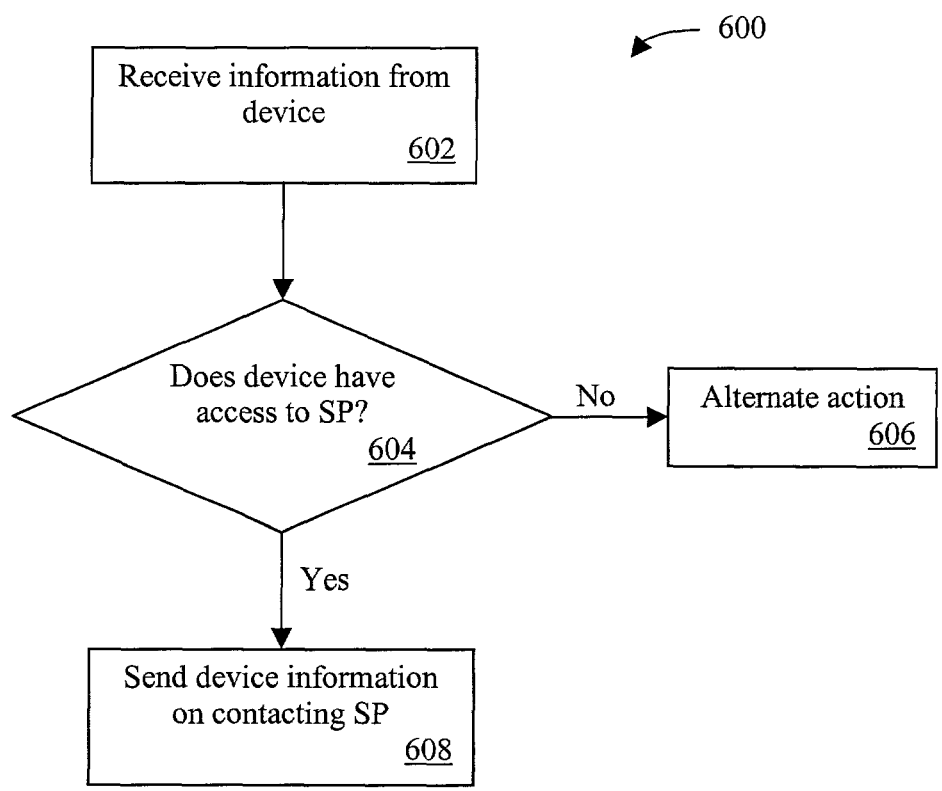
FIG. 6 illustrates one embodiment of access control for a device.

FIG. 6 illustrates one embodiment of access control 600 for a device. Here, information is received from the device 602 and then checked against a service provider (SP) to see if the device has access to the SP 604. If not, then alternative action 606 may be taken. For example, the device may be sent a message to display to the user of the device detailing why access was denied, for example, lack of funds, etc. If the device has access rights to the SP then information is sent to the device on how to contact the SP 608.

The information sent to the device on how to contact the SP 608 may be of various types. For example, if the device needs to communicate with a SP 608 via the Internet the universal resource locator (URL) or web address of the SP 608 may be sent. Additionally, such information as login procedures and/or passwords may be sent.

Figure 7:
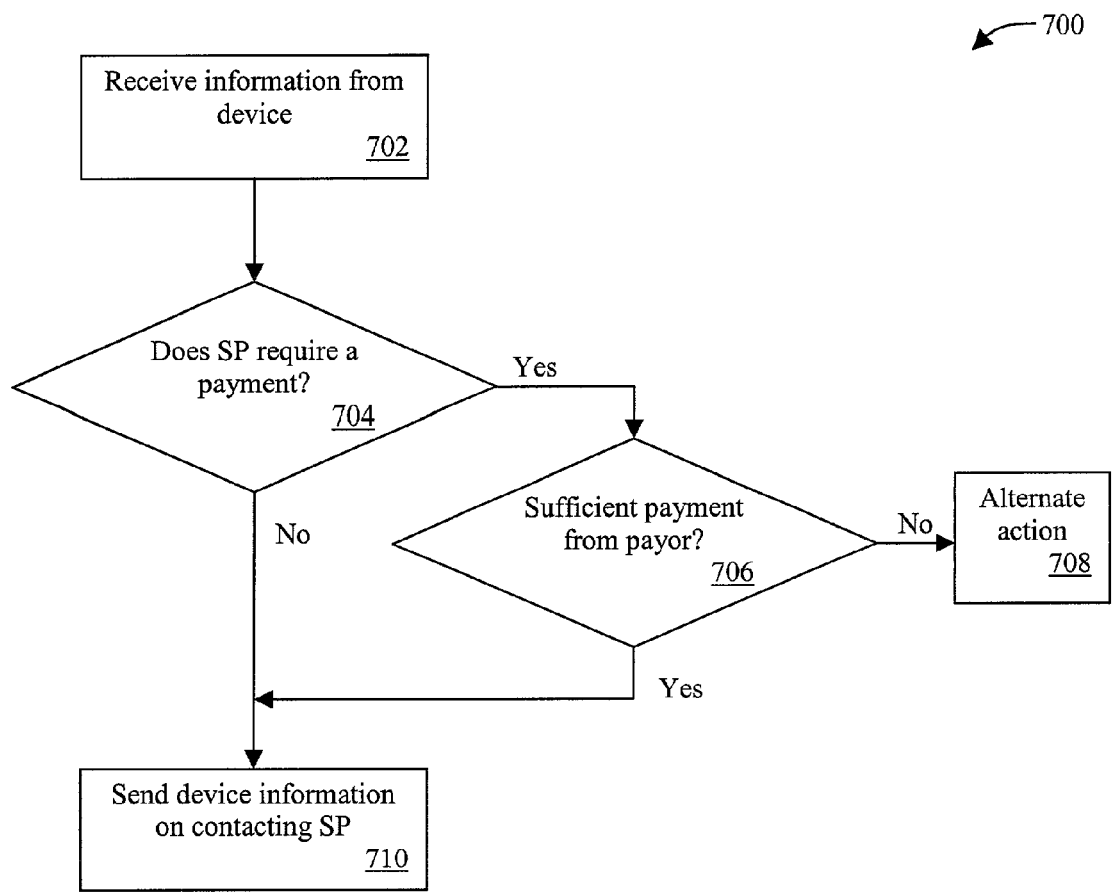
FIG. 7 illustrates another embodiment of access control 700 for a device.

FIG. 7 illustrates another embodiment of access control 700 for a device. Here, information is received from the device 702 and then checked against criteria of a service provider (SP) to see if the SP requires a payment for services 704. If not then information is sent to the device on how to contact the SP 710. If payment is required then a check is made to see if sufficient payment has been received from a payor 706. If there is sufficient payment then information is sent to the device on how to contact the SP 710. If there is not sufficient payment, then alternative action 708 may be taken. For example, the device may be sent a message to display to the user of the device detailing lack of funds.

The payor may be for example, the user, a subscriber to, for example, the service provider, or a non-subscriber. The payor may be a sponsor or an advertiser. For example, in a musical environment, a sponsor and/or advertiser may pay for a 30 second preview of a song.

Figure 9:
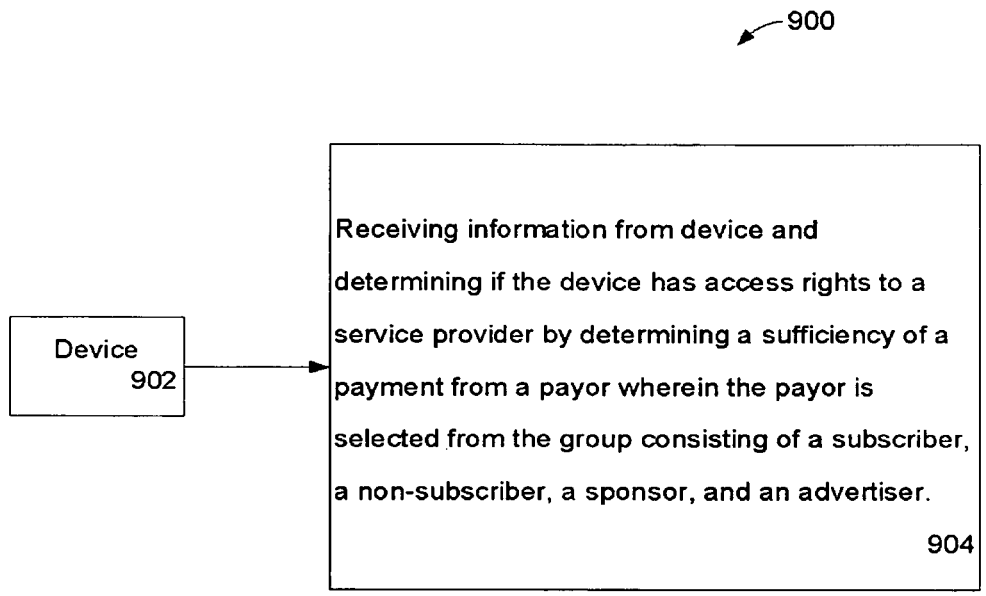
FIG. 9 illustrates one embodiment of the invention showing determining sufficiency of a payment.

FIG. 9 illustrates one embodiment of the invention 900 showing determining sufficiency of a payment. A device 902 is sending information which is received at 904 where a determination is made if the device has access rights to a service provider by determining a sufficiency of a payment from a payor wherein the payor is selected from the group consisting of a subscriber, a non-subscriber, a sponsor, and an advertiser.

Thus, a method and apparatus for relationship management of devices utilizing a network have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of managing a relationship between a device and a service provider, comprising:
   initially receiving at a service aggregator connected to a network first information from the device when the device is connected to the network, the service aggregator having information about one or more service providers and the service aggregator configured to select a specific service provider from the one or more service providers for the device based on the first information;
   secondly transmitting a second information from the service aggregator to the device directing the device to communicate with the specific service provider, the second information being based on the first information received from the device, wherein the first information is sent automatically from the device to the service aggregator;
   determining a new connection event from the device; and
   sending a new connection message to the device upon said determining said new connection event from said device;
   determining and optionally updating the device upon said sending said new connection message to the device;
   sending messages to the device upon said determining and optionally updating the device;
   receiving user input from the device upon said sending messages to the device; and
   configuring the device upon said receiving user input from the device.

2. The method of claim 1 wherein updating the device comprises updating the device's memory.

3. The method of claim 1 wherein configuring the device further comprises:
   determining a service provider; and
   transferring to the device communication information about the service provider.

4. The method of claim 3 wherein transferring to the device communication information about the service provider further comprises instructing the device to establish a connection with the service provider.

* * * * *